(12) United States Patent
Gubin

(10) Patent No.: US 8,528,444 B1
(45) Date of Patent: Sep. 10, 2013

(54) ATTACHABLE ARMREST FOR A MOWER STEERING ASSEMBLY

(76) Inventor: Ronald F. Gubin, Foxlake, WI (US)

( * ) Notice: Subject to any disclaimer, the term of this patent is extended or adjusted under 35 U.S.C. 154(b) by 185 days.

(21) Appl. No.: 13/081,029

(22) Filed: Apr. 6, 2011

(51) Int. Cl.
*B62K 21/12* (2006.01)
*A47B 96/06* (2006.01)

(52) U.S. Cl.
USPC ............ 74/551.1; 74/543; 74/544; 248/230.1

(58) Field of Classification Search
USPC ................. 74/551.1, 551.8, 544, 543, 502.2;
56/11.9, 10.6, 10.8, 12.7, 14.7, 11.3; 280/124,
280/166, 760, 288.4; 180/19.1, 65.1, 89.18,
180/89.17, 316, 332; 248/118, 118.3, 118.5,
248/230.1, 230.6
See application file for complete search history.

(56) References Cited

U.S. PATENT DOCUMENTS

| | | | |
|---|---|---|---|
| 4,067,613 A | 1/1978 | Pesiri | |
| 4,873,886 A * | 10/1989 | Renner | 74/551.8 |
| 4,916,967 A * | 4/1990 | Nakamura | 74/502.2 |
| 5,201,243 A * | 4/1993 | Schneider | 74/551.1 |
| 5,429,013 A * | 7/1995 | Taylor et al. | 74/551.1 |
| 5,913,802 A * | 6/1999 | Mullet et al. | 56/10.8 |
| 6,183,046 B1 | 2/2001 | Willoughby | |
| 7,207,237 B2 * | 4/2007 | Johnson | 74/551.8 |
| D588,613 S | 3/2009 | Schroeder et al. | |
| 8,083,247 B2 * | 12/2011 | Lee | 280/288.4 |
| 2012/0060640 A1 * | 3/2012 | Buford | 74/544 |

* cited by examiner

*Primary Examiner* — Tan Le
(74) *Attorney, Agent, or Firm* — Montgomery Patent & Design; Robert C. Montgomery

(57) ABSTRACT

An adjustable armrest that attaches to zero-radius turning mowers includes a telescoping armrest and a clamping bracket. The armrest provides a horizontal support for an operator's arm and is covered with a layer of foam padding for comfort. The clamping bracket is attachable to a steering handle at a prescribed location. In this manner, after the operator attaches an adjustable armrest on each of the steering handles the forearms and wrists are supported and the armrests pivot with the steering handles in order to preserve the comfortable supportive functioning of the armrests.

14 Claims, 4 Drawing Sheets

US 8,528,444 B1

ATTACHABLE ARMREST FOR A MOWER STEERING ASSEMBLY

RELATED APPLICATIONS

The present invention was first described in a notarized Official Record of Invention on Jun. 11, 2010, that is on file at the offices of Montgomery Patent and Design, LLC, the entire disclosures of which are incorporated herein by reference.

FIELD OF THE INVENTION

The present invention relates generally to armrest assemblies, and in particular, to an armrest assembly attachable to the steering control mechanism of a zero-radius turning mower.

BACKGROUND OF THE INVENTION

Many Americans spend countless hours maintaining and beautifying their lawns and landscape. As a matter of pride and personal expression, these people manicure their grass, plant and maintain flowers, shrubs, bushes, and trees all for the sake of enhancing the aesthetic qualities of their property. On properties with large areas of grass to cut, zero-radius turning riding mowers are very popular. These mowers utilize two (2) operating levers which are pushed forwards and backwards to control the movement of the mower. This steering control allows for much faster cutting times, particularly when there are many obstacles on the lawn, such as trees and shrubs. Due to the reduced cutting times and increased productivity, these zero-radius turning mowers are the preferred machine for those in the commercial lawn care industry. These types of mowers allow their users to cut relatively large areas of grass in a minimal amount of time while allowing the rider to sit in comfort.

While these mower are typically supplied with armrests mounted next to the seat, the operating levers require almost continual adjustment and the user is either forced to hold their arms up off of the armrest resulting in discomfort in arm, shoulder, and back muscles, or they must slide their arms continuously back and forth over the armrest resulting in skin irritation.

SUMMARY OF THE INVENTION

The inventor has therefore recognized the aforementioned inherent problems and lack in the art and observed that there is a need for a device by which zero-radius turning mowers can be operated with improved comfort without the disadvantages as described above. In accordance with the invention, it is an object of the present disclosure to solve these problems.

The inventor recognized these problems and has addressed this need by developing an attachable armrest for a mower steering assembly that allows for the cutting of grass using a zero-radius turning mower in a manner which provides increased comfort. The inventor has thus realized the advantages and benefits of providing a handle bracket which is releasably fastened to an exterior of a steering handle of the mower steering assembly. The handle bracket is positioned adjacent to an end gripped by the operator. An armrest assembly is affixed in a generally perpendicularly orientation to the handle bracket in order to provide support for a forearm and wrist area of the operator while manipulating the steering handles. The armrest assembly is positioned generally parallel to the end gripped by the operator such that they are positioned in an appropriate location relative to the location of the hands when operating the mower.

The armrest assembly is telescopic and includes a tubular inner armrest affixed to a convex exterior of the handle bracket and a tubular outer armrest which is telescopingly coupled over the inner armrest. A position lock mechanism is provided for locking the outer armrest and the inner armrest together and against telescopic or rotational movement.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
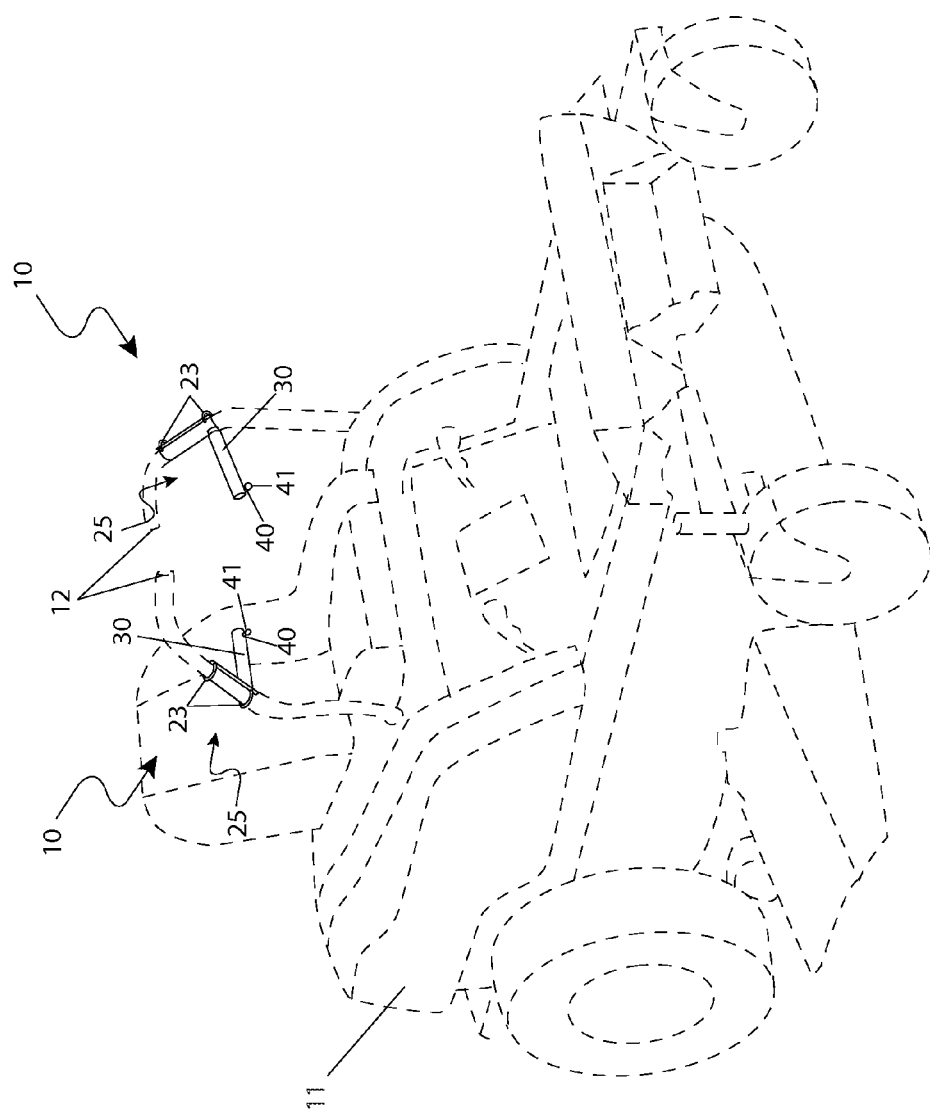
FIG. 1 is an environmental view of an attachable armrest for a mower steering assembly, according to a preferred embodiment in accordance with the invention.

DESCRIPTIVE KEY 10 attachable armrest for a mower steering assembly
11 mower
12 steering handle
20 handle bracket
21 flange
22 flange aperture
23 U-bolt
24 fastener
25 armrest assembly
30 outer armrest
31 outer aperture
35 inner armrest
36 inner aperture
37 welding
38 angle "A"
39 angle "B"
40 detent pin
41 ring

DETAILED DESCRIPTION OF THE PREFERRED EMBODIMENT

In accordance with the invention, the best mode is presented in terms of a preferred embodiment, herein depicted within FIGS. 1 through 4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 4, depicting an attachable armrest for a mower steering assembly (herein described as a "device") 10, where like reference numerals represent similar or like parts. In accordance with the invention, the present disclosure describes a forearm and wrist support particularly adapted for use with a zero-radius turning mower 11 or similar lawn care machine. The device 10 is variable to a user's desire and fit. The device 10 sustains the user's forearm and wrist during utilization of the mower 11.

FIG. 1 shows an environmental view of the device 10. During use, a pair of devices 10 are preferably utilized, in which each device 10 is removably attached to the steering assembly of the mower 11, preferably at each steering handle 12. On a zero-radius turning mower 11, the steering handles 12 are generally a tubular-shape extremity and provide a gripping lever for the user to manipulate the direction of the mower 11. The device 10 supports the user's left and right forearm and wrist while the mower 11 is being used. The device 10 can be attached at a desired position upon the steering handles 12. The device 10 is attached to the steering handles 12 by engaging and fastening a handle bracket 20 with a pair of U-bolts 23 (see FIG. 2). The U-bolts 23 are preferred because of the circular cross-sectional geometry of the handles 12. When the device 10 is utilized, the user rests his or hers forearms and wrist upon an outer armrest 30. The device 10 may be manufactured in various sizes to accommodate a variety of mower 11.

Figure 2:
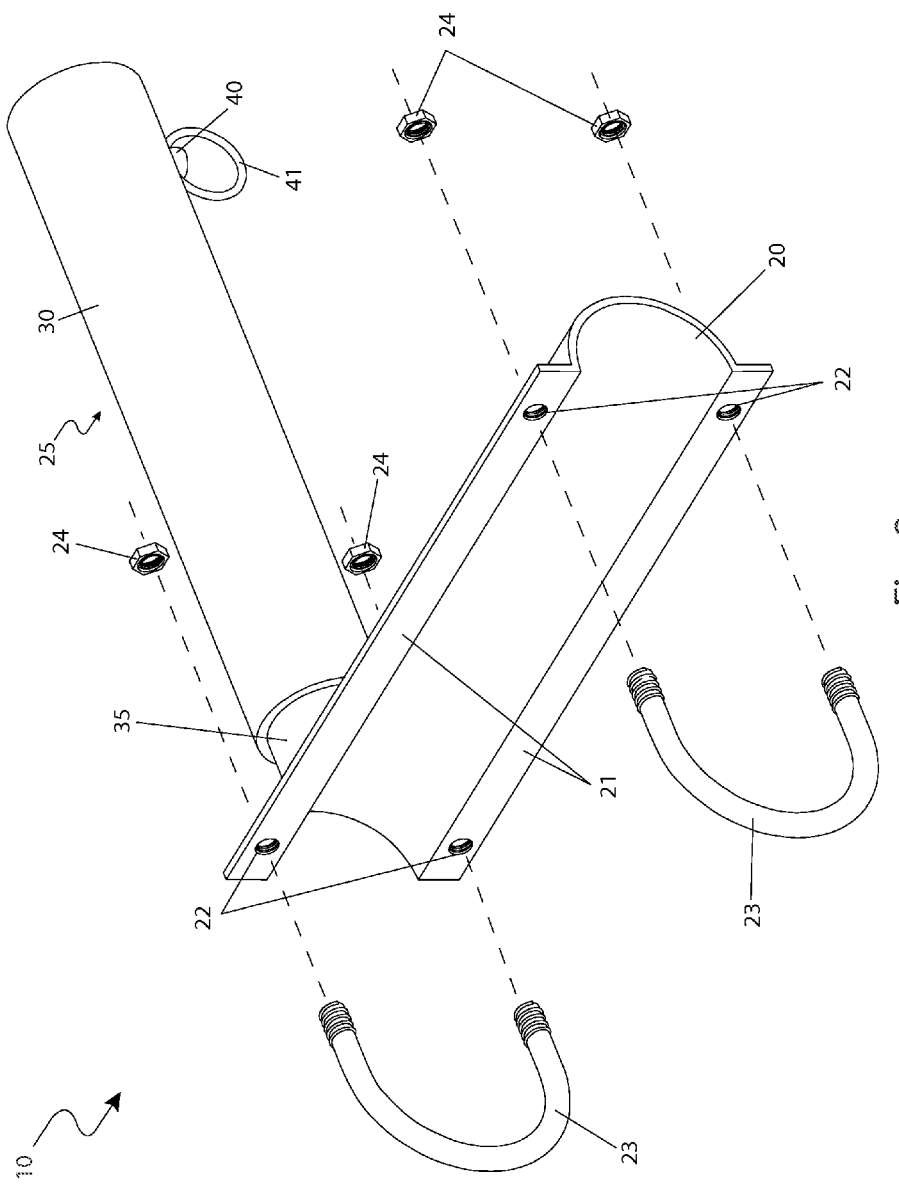
FIG. 2 is a rear perspective view of the attachable armrest for a mower steering assembly, according to the preferred embodiment.

FIG. 2 shows a rear perspective view of the device 10. The handle bracket 20 encompasses approximately half of the perimeter surface of the steering handle 12 and provides an attachment surface for the device 10. The handle bracket 20 has an arcuate-profile, a generally semi-cylindrical shape and includes a pair of perpendicular flanges 21 upon opposing outer perimeter edges which provide a surface for the pair of U-bolts 23 to pass through. Each flange 21 includes a pair of flange apertures 22 on opposing end portions. Opposing flange apertures 22 on opposing flanges align to enable placement of the U-bolts 23. The handle bracket 20 is positioned at a desired location on the steering handle 12 with the concave surface of the handle bracket 20 facing an exterior surface of the steering handle 12. The handle bracket 20 is fastened into position by engaging the pair of U-bolts 23 from an opposing exterior side surface of the steering handle 12. The U-bolts 23 are inserted through the corresponding opposing flange apertures 22 and fastened around the steering handle 12 by a pair of fasteners 24. The U-bolts 23 are preferably "U"-shaped double-ended bolts which include threads upon each end which are threadably engaged by the pair of fasteners 24. The fasteners 24 are preferably a nut or similar fastening hardware. The handle bracket 20 and U-bolts 23 are fabricated from materials such as, but not limited to: stainless steel, plastic, or the like.

Figure 3:
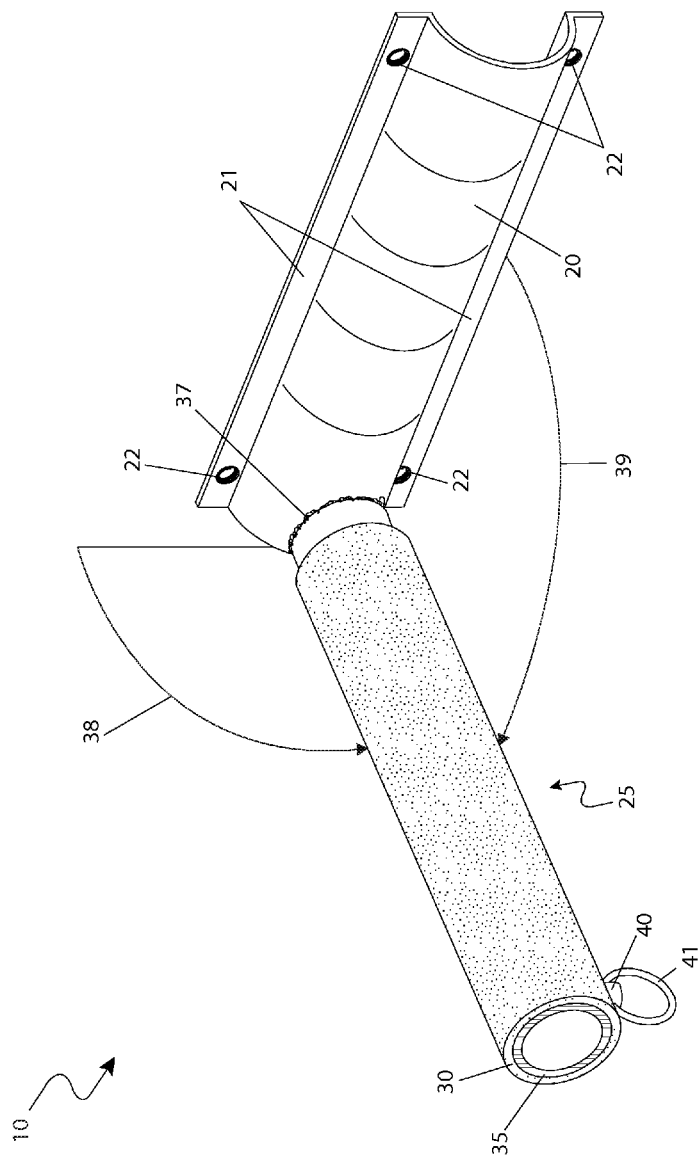
FIG. 3 is a front perspective view of the attachable armrest for a mower steering assembly, according to the preferred embodiment; and, FIG. 4 is an exploded view of a armrest assembly, according to the preferred embodiment.
Figure 4:
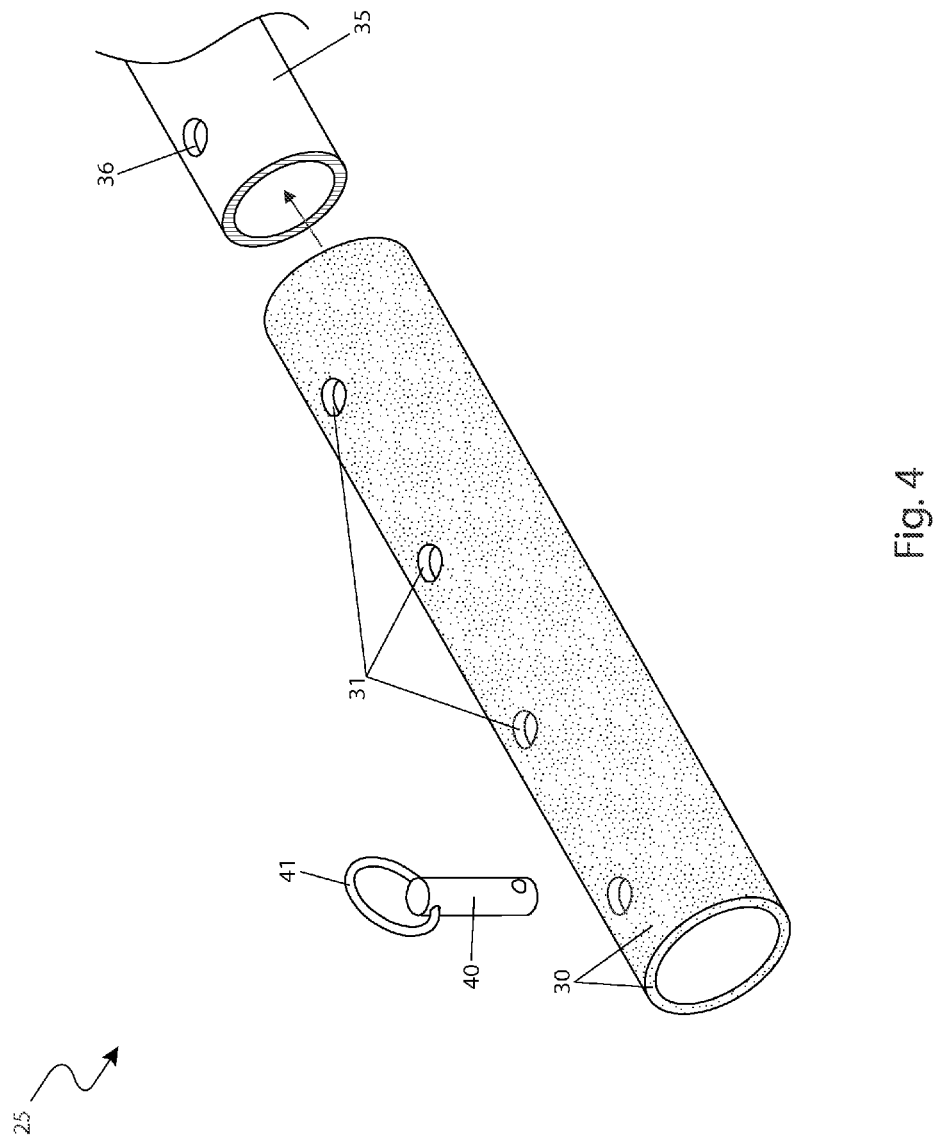

FIG. 3 shows a front perspective view of the device 10 and FIG. 4 shows an exploded view of the armrest assembly 25. The device 10 also includes an armrest assembly 25 which provides a surface for the user to rest their forearm and wrist upon. The armrest assembly 25 is illustrated being perpendicular to the handle bracket 20 and attached to the convex surface of the handle bracket 20 by welding 37, yet it can be appreciated that other positions and material joining techniques can be utilized without limiting the scope of the device 10. The armrest assembly 25 includes a length adjustable outer armrest 30 and a fixed inner armrest 35. Each handle 30, 35 is preferably tubular shaped with the outer armrest 30 having a slightly larger diameter than the inner armrest 35 to allow telescoping engaging of the outer armrest 30 over the inner armrest 35. The handles 30, 35 can include various lengths as desired by manufacturing. The outer armrest 30 is preferably fabricated from a foam or padded material and the inner armrest 35 is preferably fabricated from a material similar to the handle bracket 20.

The inner armrest 35 is affixed on an end portion of the convex surface of the handle bracket 20 preferably by welding 37 and it can be appreciated that the angle of the inner armrest 35 relative to the handle bracket 20 can be oriented at varying degrees as desired by the manufacturer and style of the mower 11. FIG. 3 depicts an angle "A" 38 and an angle "B" 39 to illustrate the various positions in which the inner armrest 35 can be positioned as desired. Angle "A" 38 and angle "B" 39 are preferably manufactured in various angles as to comply with various steering handles 12.

The outer armrest 30 includes plurality of parallel outer apertures 31 disposed through a lower surface and the inner armrest 35 includes an inner aperture 36 also disposed through a lower surface. As the outer armrest 30 slidingly engages over the inner armrest 35, a prescribed outer aperture 31 is aligned with the inner aperture 36 in order to adjust the overall length of the armrest assembly 25 as desired by the user. The handles 30, are securely fastened to each other by inserting a detent pin 40 within the aligned outer aperture 31 and inner aperture 36. The detent pin 40 has a generally cylindrical shaft sized to removably fit through the aligned apertures 31, 36 and includes an attached ring 41 to enable easy removal. Other mechanisms can also be used to removably fasten the handles 30, 35.

It is envisioned that other styles and configurations invention can be easily incorporated into the teachings of the present disclosure and only one particular configuration has been shown and described for purposes of clarity and disclosure and not by way of limitation of scope.

In accordance with the invention, the preferred embodiment can be utilized by the user in a simple and effortless manner with little or no training. After initial purchase or acquisition of the device 10, it would be installed as indicated in FIG. 1.

The method of utilizing the device 10 may be achieved by performing the following steps: acquiring the device 10; positioning the handle bracket 20 onto the steering handle 12; inserting the U-bolts 23 into the flange apertures 22 and engaging the fasteners 24 onto the U-bolts 23, thereby fastening the handle bracket 20 onto the steering handle 12; removing the detent pin 40 from the outer aperture 31 and inner aperture 36 and positioning the inner armrest 30 to a desired position; replacing the detent pin 40 into the desired outer aperture 31 and inner aperture 36; repeating the above-mentioned steps for another steering handle 12 as desired; and, allowing for the cutting of grass using a zero-radius turning mower 11 in a manner which provides increased comfort.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An attachable armrest and mower steering assembly, said armrest comprising:
   a handle bracket comprising a convex exterior and a concave interior releasably fastened to an exterior of a steering handle of said mower steering assembly adjacent to an end gripped by an operator;
   at least two fasteners releasably fastened to said handle bracket around said steering handle; and,
   an armrest assembly affixed generally perpendicularly to said handle bracket to provide a support for a forearm and wrist area of said operator, further comprising:
      a tubular inner armrest affixed to said convex exterior;
      a tubular outer armrest telescopingly coupled over said inner armrest; and,
      a position lock mechanism for locking said outer armrest and said inner armrest against telescopic movement;
   wherein said armrest assembly is positioned generally parallel to said end gripped by said operator;
   wherein said armrest assembly protrudes outwardly from said convex exterior; and,
   wherein said concave interior receives said steering handle and said fasteners maintain said handle bracket in gripping contact with said steering handle.

2. The armrest and mower steering assembly of claim 1, wherein said armrest assembly further comprises a telescoping member.

3. The armrest and mower steering assembly of claim 2, wherein said armrest assembly is disposed at an end of said handle bracket.

4. The armrest and mower steering assembly of claim 1, wherein said handle bracket further comprises a flange disposed along opposing longitudinal edges;
   wherein said flanges extend perpendicularly outward from said convex exterior.

5. The armrest and mower steering assembly of claim 4, wherein said flanges each further comprises at least two flange apertures for receiving said at least two fasteners.

6. The armrest and mower steering assembly of claim 5, wherein each of said fasteners further comprises a U-bolt.

7. The armrest and mower steering assembly of claim 6, wherein said flange apertures disposed through opposing flanges are aligned to receive opposing legs of said U-bolt.

8. The armrest and mower steering assembly of claim 7, wherein each of said U-bolts is secured to said handle bracket by a set of nuts.

9. The armrest and mower steering assembly of claim 8, wherein said position lock mechanism further comprises:
   an inner aperture disposed through a side of said inner armrest adjacent to an end opposite said handle bracket;
   a plurality of outer apertures disposed through a side of said outer armrest; and,
   a detent pin;
   wherein said detent pin is insertable through one of said outer apertures and into said inner aperture which is aligned with said one outer aperture to lock said outer armrest relative to said inner armrest.

10. The armrest and mower steering assembly of claim 9, wherein said outer armrest further comprises a padded material.

11. The armrest and mower steering assembly of claim 10, wherein said inner armrest is disposed at an end of said handle bracket.

12. An attachable armrest and mower steering assembly, said armrest comprising:
   a handle bracket comprising a convex exterior and a concave interior releasably fastened to an exterior of a steering handle of said mower steering assembly adjacent to an end gripped by an operator;
   a telescoping armrest assembly protruding outwardly from said convex exterior to provide a support for a forearm and wrist area of said operator, further comprising:
      a tubular inner armrest affixed to said convex exterior having an inner aperture disposed through a side adjacent to an end opposite said handle bracket;
      a tubular outer armrest telescopingly coupled over said inner armrest having a plurality of outer apertures disposed through a side; and,
      a detent pin; and,
   at least two U-bolt fasteners releasably fastened to said handle bracket around said steering handle;
   wherein said handle bracket further comprises a flange disposed along opposing longitudinal edges extending perpendicularly outward from said convex exterior, said flanges each further comprising at least two flange apertures for receiving said at least two U-bolt fasteners;
   wherein said flange apertures disposed through opposing flanges are aligned to receive opposing legs of an individual U-bolt;
   wherein said concave interior receives said steering handle and said fasteners maintain said handle bracket in gripping contact with said steering handle;
   wherein said armrest assembly is positioned generally parallel to said end gripped by said operator; and,
   wherein said detent pin is insertable through one of said outer apertures and into said inner aperture which is aligned with said one outer aperture to lock said outer armrest relative to said inner armrest and against.

13. The armrest and mower steering assembly of claim 12, wherein said outer armrest further comprises a padded material.

14. A method of supporting a forearm and wrist areas of an operator when operating a lawn mower, said method comprising the steps of:
   providing a zero-radius turning lawn mower having a pair of opposing steering handles used for steering control;
   providing a pair of attachable armrests for a mower steering assembly each comprising a handle bracket comprising a convex exterior and a concave interior releasably fastened to an exterior of a steering handle of said mower steering assembly, a telescoping armrest assembly comprising a tubular inner armrest affixed to and protruding outwardly from said convex exterior, a tubular outer armrest telescopingly coupled over said inner armrest, and a position lock mechanism for locking said outer armrest and said inner armrest against telescopic movement, and at least two U-bolt fasteners releasably fastened to said handle bracket around said steering handle;
   positioning one handle bracket upon each steering handle such that said concave interior receives said steering handle;
   positioning said armrest assembly generally parallel to said end gripped by said operator;
   fastening said U-bolt fasteners around said steering handle and to said handle bracket to maintain said handle bracket in gripping contact with said steering handle; and, operating said lawn mower such that said forearm and wrist areas of said operator are supported on said armrest assemblies.

\* \* \* \* \*